E. F. BLISS.
HEATING SYSTEM.
APPLICATION FILED AUG. 5, 1914.
1,161,596. Patented Nov. 23, 1915.
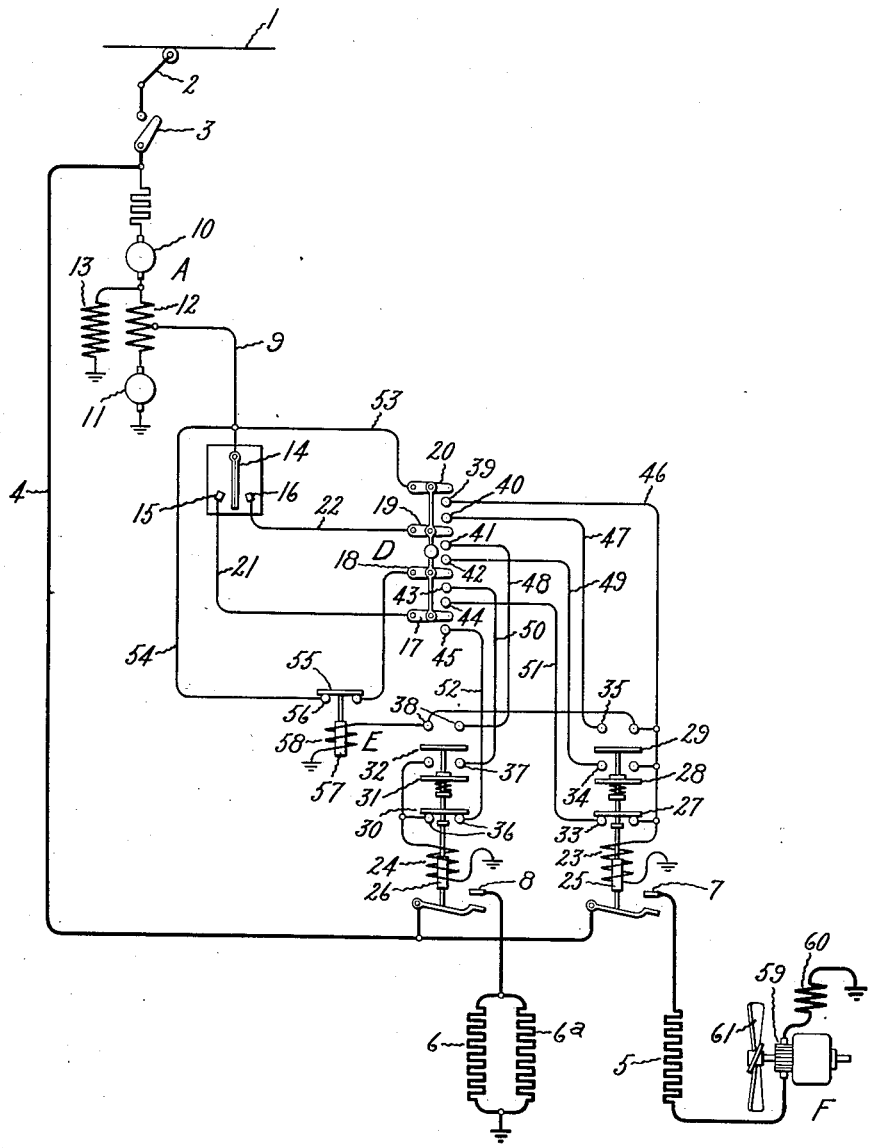
Witnesses:
Earl G. Klock,
J. Ellis Glen.
Inventor:
Elmer F. Bliss,
by
His Attorney.

UNITED STATES PATENT OFFICE.

ELMER F. BLISS, OF SCHENECTADY, NEW YORK, ASSIGNOR TO GENERAL ELECTRIC COMPANY, A CORPORATION OF NEW YORK.

HEATING SYSTEM.

1,161,596.      Specification of Letters Patent.     Patented Nov. 23, 1915.

Application filed August 5, 1914. Serial No. 855,157.

*To all whom it may concern:*

Be it known that I, ELMER F. BLISS, a citizen of the United States, residing at Schenectady, in the county of Schenectady, State of New York, have invented certain new and useful Improvements in Heating Systems, of which the following is a specification.

My invention has reference to an electric heating system and has for its object the provision of means whereby the temperature of the surrounding atmosphere may be maintained at a substantially uniform temperature through wide variations of temperatures prevailing outside the room or space within which the heating system is located.

My invention is well adapted for a car heating system, although it will be obvious that it is not limited to such use. Under certain conditions, as for example where cars run through mountainous districts, the temperature without the car varies between wide limits within a comparatively short space of time, and the amount of energy that must be converted into heat by the heating system in order to maintain the temperature of the car substantially uniform must correspondingly vary between wide limits.

My invention makes provision for supplying heat in variable amounts in order to keep the temperature of the car or other space in which the heating system is operated at a substantially uniform temperature, and comprises a heating system in which there is a plurality of heating elements and means for energizing one or both of said elements in accordance with the heat requirements and for automatically regulating said elements to maintain the room temperature substantially uniform.

For a fuller understanding of my invention, reference may be had to the accompanying drawing, which shows diagrammatically my invention embodied in a car heating system.

Referring to the drawings, 1 is a trolley wire which is connected to the conductor or bus 4 on the car by means of the trolley 2 and switch 3. Two groups of electric heaters 5 and 6 are connected to the conductor 4 by means of electromagnetically actuated switches or contactors 7 and 8, each of which comprises a stationary and a movable contact. One of the heaters is preferably formed to supply a greater amount of heat than the other, and I have here shown the heater 5 as consisting of a single coil or unit, and the heater 6 of two coils or units 6, 6ª connected in multiple.

I have illustrated my invention in a system in which the trolley wire and the heating elements which are connected directly thereto carry a higher voltage than does the regulating mechanism for the heating devices. A conductor or bus 9 on the car is connected to the trolley through a dynamotor A of usual design, comprising a motor armature 10 and a generator armature 11 with a common series and shunt field 12 and 13, respectively, the conductor or bus 9 being connected intermediate the terminals of the series winding 12. The conductor 9 is connected to a thermostat 14 of well known construction, which engages a contact 15 when a predetermined minimum temperature obtains in the car, and a contact 16 when a predetermined maximum temperature is reached. The contact 15 is connected by the conductor 21 to one arm 17 of a double pole double throw switch D provided, in addition to the arm 17, with arms 18, 19, and 20. The other contact 16 for the thermostat is connected by the conductor 22 to the arm 19 of the switch D.

The contactors 7 and 8 have coils 23 and 24 respectively with which coöperate armatures 25 and 26. The core 25 actuates bridging members 27, 28, and 29, and the core 26 similar members 30, 31, and 32. The bridging members of the contactor 7 coöperate with stationary contacts 33, 34, and 35 respectively, and those of the contactor 8 with stationary contacts 36, 37, and 38, the bridging members 27 and 30 engaging the contacts 33 and 36 respectively when the cores 25 and 26 are in the lower positions corresponding to a deënergized condition of the coils 23 and 24, while the bridging members 28, 29, 31 and 32, under the same conditions, are disengaged from their corresponding contacts and are only brought into engagement with these contacts when the coils 23 and 24 are energized and the cores lifted.

The arms of the double throw switch D coöperate with contacts 39, 40, 41, 42, 43, 44, and 45. When the switch is moved upwardly the arms 17, 18, and 19 engage contacts 44, 42, and 40, respectively, while when the switch is moved in the opposite direction, the arms 17, 18, 19, and 20 engage contacts 45, 43, 41, and 39, respectively. The contact 39 is connected by the conductor 46 to the coil 23, the contact 40 by the conductor 47 to one of the stationary contacts 35, the contact 41 by the conductor 48 to one of the stationary contacts 38, the contact 42 by the conductor 49 to one of the stationary contacts 34, the contact 43 by the conductor 50 to one of the stationary contacts 37, contact 44 by the conductor 51 to one of the stationary contacts 33, and contact 45 by the conductor 52 to one of the stationary contacts 36. Each of the arms 20 and 18 of the switch D are connected to the conductor or bus 9, the arm 20 directly thereto by the conductor 53, while the arm 18 is connected thereto by the conductor 54 through a switch governed by a relay E and comprising a bridging member 55 which engages the stationary contacts 56 and which is actuated by the core 57 of the coil 58 of the relay. When the coil 58 is deënergized, the member 55 engages the contacts 56, as is obvious, while, when the coil is energized, the circuit comprising the conductor 54 is opened at the contacts 56.

A fan motor F comprising the armature 59 and series field 60 is connected in series with the heating coil 5. The fan 61 is associated with the heating coil 5 so as to cause a distribution of the air heated by the coil through the space to be heated whenever this coil is in operation.

The operation of my device is as follows: When the minimum heat demand is to be made upon the heating system, corresponding usually to prevailing mild weather conditions outside the car, the manually operated switch D is moved to the upper position. Now, when the minimum permissible temperature in the car is reached, the thermostat 14 engages the contact 15 and a circuit is closed through the conductor 21, arm 17, contact 44, conductor 51, contacts 33, and bridging member 27 through the coil 23 to the ground. The contactor 7 is thus energized, thus closing the circuit through the heating coil 5 and the fan motor F. The upward movement of the core 25 opens the circuit of the thermostat at the contacts 33, thus breaking the circuit therethrough. This is desirable, since the thermostat is ordinarily of rather delicate construction and is not well adapted to break or carry an appreciable current for any period of time. At the same time a holding circuit is completed through the coil 23 by the bridging member 28 engaging the stationary contacts 34. This circuit includes the conductors 9 and 54, stationary contacts 56 and bridging member 55, arm 18 of the switch, contact 42, conductor 49, stationary contacts 34, bridging member 28, and the coil 23. This coil remains energized, and the circuit to the heating coil 5 remains closed until a predetermined maximum temperature in the car is reached, when the thermostat 14 will engage the contact 16 and a circuit is completed from the conductor 9 through the conductor 22, arm 19 of the switch, contact 40, conductor 47, contacts 35 and bridging member 29 through the coil 58 of the relay E. The coil is energized, and the circuit of the coil 23 of the contactor 7 is broken at the contacts 56 of the relay E. The coil 23 is thus deënergized, and the switch 7, which is now opened, remains open until the thermostat 14 again engages the contact 15. Now, if the weather conditions prevailing outside the car are such as to require a maximum demand upon the heating system, the switch D is thrown to the lower position, at which time the arm 20 of the switch will engage contact 39, thus permanently closing a circuit from the conductor or bus 9 through the coil 23 of the contactor 7, thus permanently closing the circuit through the heater 5. Under these conditions, the contactor 8 responds to the movement of the thermostat 14 in precisely the same manner as did contactor 7 when the switch D was thrown to its upper position, and the heater 6 is regulated in the same manner as was the heater 5. When the minimum temperature permissible in the car is now reached, the thermostat 14 engages the contact 15 and closes a circuit through the conductor 21, arm 17 of the switch, contact 45, conductor 52, contacts 36 and bridging member 30 through the coil 24 of the contactor 8. The coil 24 is thus energized, and the circuit to the heater 6 is closed. At the same time the circuit of the thermostat is broken at the contacts 36, and the holding circuit through the coil 24 of the contactor 8 is closed through conductors 9 and 54, stationary contacts 56, and bridging member 55, arm 18 of the switch, contact 43, stationary contacts 37 and bridging member 31. The coil 24 will thus remain energized, and the heater 6 will remain in circuit until the thermostat 14 engages the contact 16, when the relay E will be energized and the circuits to the coil 24 and the heater 6 will be broken in the same manner as the circuits to the coil 23 and the heater 5, as previously described.

It will thus be seen that the heating system embodying my invention comprises separate electric heaters and a regulating mechanism therefor so arranged as to utilize but one of the heaters when a minimum demand is made upon the system, and that this heater will then maintain the temperature of the car or other space within which the heating system is located at a substantially uniform temperature, and that when the maximum heat demand is made upon the system, the circuit to the first heating element is permanently closed, and the second heating element is actuated and regulated in response to the temperature of the car.

Another important feature of my invention is the fan motor combined with a heating system of the character described. The fan motor is associated with that heating element which is always energized when any heat is being generated thereby insuring a distribution of heat through the car whenever either of the heating elements is in operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an electric heating system, a heater comprising two groups of heating elements of different heat generating capacity, means for intermittently connecting the group of lower capacity to the source of energy supply for one condition of operation, and for permanently connecting said group to the source of energy supply and intermittently connecting the group of higher heat generating capacity to the source of energy supply for another condition of operation.

2. In an electric heating system, a heater comprising two groups of heating elements, manually operated means for connecting one only or both of said groups to the source of energy supply, and thermally responsive means for governing the energy supply to the one group when that group only is connected to the source of supply, and for governing the energy supply to the other group alone when both groups are so connected.

3. In an electric heating system, an electric heater comprising two groups of heating elements, means comprising a manually operated switch for connecting in one position of the switch one only of said groups to the source of energy supply, and in the other position for connecting both groups to the source of supply, and a thermostat for governing the energy supply to the first group when the switch is in the first position, and for governing the energy supply to the other group when the switch is in another position, the first group at that time being permanently connected to the source of supply.

4. An electric heating system comprising separate heating elements, electromagnetically operated circuit closers for controlling the circuits of the respective heaters, a thermostat for controlling the circuits to said electromagnetic devices, and a manually operated switch for closing the circuits of one or both of said electromagnetic devices.

5. An electric heating system comprising two separate heating elements, electromagnetic circuit closers for controlling the circuits to the respective heating elements, an operating and a holding circuit for each electromagnetic device, and a common thermostat for closing the operating circuits of said electromagnetic devices.

6. An electrically operated heating system comprising separate heating elements, electromagnetically operated circuit closers for controlling the circuits to said elements, a manually operated switch for closing the circuit to a certain one or to both of said electromagnetically operated devices, an operating and a holding circuit for each of said devices, a thermostat for controlling the operating circuit to each of said devices, and a relay jointly under the control of the thermostat and said electromagnetically operated devices for opening the holding circuits of the respective electromagnetic circuit closers.

7. An electrically operated heating system comprising separate heating elements, electromagnetic circuit closers for controlling the circuits to the respective heaters, a manually operated circuit closer for closing the circuits to a certain one or to both of said electromagnetically operated devices, operating and holding circuits for the respective electromagnetic devices, a thermostat movable in one direction to close one or the other of said operating circuits in accordance with the position of the manually operated circuit closer, and a relay responsive to the movement of the thermostat in the opposite direction for opening one or the other of said holding circuits.

8. In a heating system for supplying a variable amount of heat, separate heating elements, a regulating system for causing a certain one, or both of said heating elements to generate heat, and a fan motor associated with the first named heating element.

9. In an electrically operated heating system for supplying a variable amount of heat, separate electric heating elements, a regulating system for closing the circuits to a certain one or to both of said heating elements, and an electric fan motor connected in series with the first named heating element.

In witness whereof, I have hereunto set my hand this 3d day of August, 1914.

ELMER F. BLISS.

Witnesses:
 HELEN ORFORD,
 MARGARET E. WOOLLEY.